Inventor:
Floris Koppelmann
By: Spencer & Kaye
Attorneys

United States Patent Office 3,399,336
Patented Aug. 27, 1968

3,399,336
INVERTER CIRCUITS WITH CAPACITOR BRIDGE COMMUTATOR CIRCUITS
Floris Koppelmann, Berlin-Siemensstadt, Germany, assignor to Licentia Patent-Verwaltungs-G.m.b.H., Theodor-Stern-Kai, Frankfurt am Main, Germany
Filed Apr. 20, 1965, Ser. No. 449,419
Claims priority, application Germany, Apr. 21, 1964, L 47,652
5 Claims. (Cl. 321—5)

ABSTRACT OF THE DISCLOSURE

A polyphase inverter connected to a D.C. power source having at least two commutating circuits each comprising four thyristors connected in bridge with a capacitator connected across the diagonal of the bridge. The two commutating circuits are periodically switched to each of the different phases, or they are connected directly across the power controlling elements of each phase, one commutating circuit per element. In another embodiment, the commutating circuits themselves constitute the power controlling elements in each phase of the inverter, one commutating circuit per element.

The present invention relates to an electric circuit, and, more particularly, to a self-commutating inverter, i.e., a circuit which converts direct current into alternating current.

There exist self-commutating inverters in which the commutation is forced by means of capacitors, so that the commutation takes place independently of the voltage of the load.

There also exist inverters which are pulsed such that an alternating current voltage or a polyphase voltage of variable frequency and variable voltage can be derived from a fixed direct current voltage. Such inverters are used, for example, for operating polyphase motors throughout all four quadrants at frequencies up to 100 cycles per second or higher.

Semiconductor elements which are used in above described arrangements are operated in well-known manner for example as described GEC–Manual 1961, pages 40, 39 and 36.

It has been found that the extinction capacitors of such inverter circuits are often subjected to such high loads that medium frequency capacitors have to be used or that low frequency capacitors have to be operated below their normal rated values or be artificially cooled. Here, it was up to now customary to make use of the capacitators, for extinguishing purposes, by charging them in but one direction and to re-charge the capacitators by means of a resonant circuit.

The arrangements above were thus found to possess a number of inherent drawbacks, and it is, therefore, the primary object of the present invention to provide an inverter which is free of the above drawbacks.

Accordingly, the present invention relates to a self-commutating inverter equipped with a capacitator extinction circuit, and in accordance with the present invention, the extinction capacitators operate in opposition to each other, i.e., in push-pull, with the help of extinction thyristors which are connected, in groups of four, in a bridge circuit.

Figure 1:
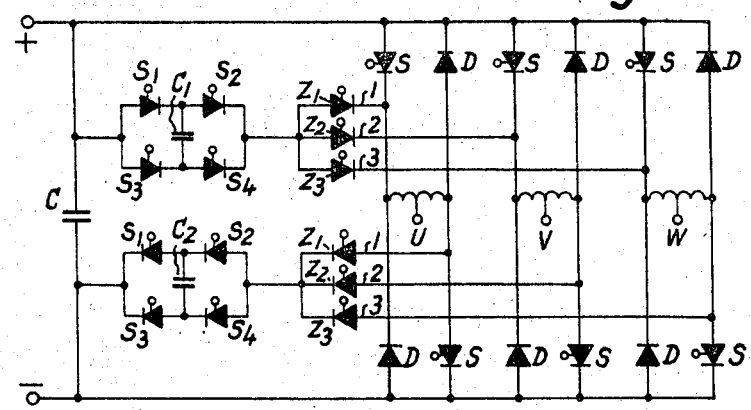
Figure 2:
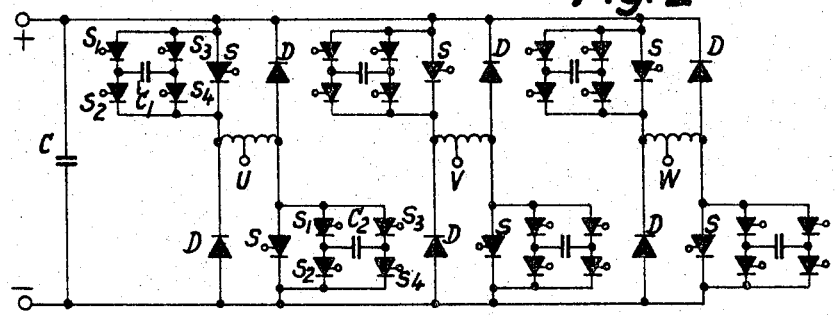
Figure 3:
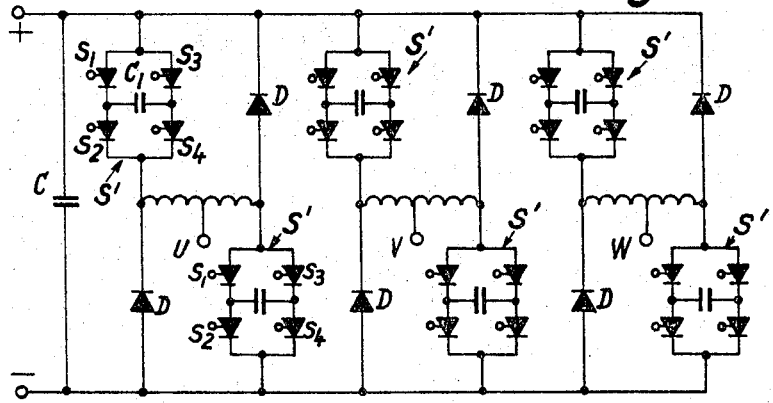

Additional objects and advantages of the present invention will become apparent upon consideration of the following description when taken in conjunction with the accompanying drawings in which:

FIGURES 1, 2 and 3 are circuit diagrams of three embodiments of the present invention. While the four-thyristor bridge circuits in FIGURES 1 and 2 are intended solely to supply the extinction current pulses, the bridge circuits of the circuit of FIGURE 3 are connected directly to the main current circuit and thus carry the main current of the phases, this current being extinguished by the alternate firing of one of the four thyristors.

Referring now to FIGURE 1 in particular, the same shows an inverter which is fed by a source of direct current and which has output terminals U, V and W. A buffer capacitator C is connected directly across the terminals to which the direct current source is connected. Each phase of the inverter comprises two controllable semiconductor elements S and two diodes D. The controllable semiconductor elements S, which are the main or phase thyristors, are extinguished by means of the extinction capacitators $C_1$ and $C_2$ which are connected across the diagonals of and work in conjunction with respective bridge circuits, each comprising the extinction thyristors $S_1$, $S_2$, $S_3$, $S_4$, which form the four arms of the bridge circuit, the capacitators $C_1$ and $C_2$ operating in opposition, i.e., in push-pull. The current extinction pulse produced by the respective capacitators is applied to the individual phase lines via leads 1, 2, 3 and further controllable semiconductor elements $Z_1$, $Z_2$, $Z_3$.

The circuit of FIGURE 2 differs from that of FIGURE 1 in that it does not comprise any separate phase leads, instead, each of the main thyristors S has connected across it its own bridge circuit incorporating the four extinction thyristors $S_1$, $S_2$, $S_3$, $S_4$ and capacitators $C_1$, $C_2$.

The circuit of FIGURE 3 differs from the circuits of FIGURES 1 and 2 in that the main thyristors are constituted by thyristor circuits S′ each of which incorporates the bridge circuit incorporating the thyristors $S_1$, $S_2$, $S_3$, $S_4$ and the associated capacitator $C_1$ or $C_2$. As a result, each of the extinction thyristors carries the full phase current.

The circuit according to the present invention is particularly suited for high power inverters. In inverters having a power rating of up to several hundred kilowatts, the bridge circuit connection of the thyristors allows the use of individual thyristors, as shown, without it being necessary to let each of the extinction thyristors be constituted by a number of parallelly connected individual thyristors. In the circuits of FIGURES 1 and 2, the main thyristors S may be constituted, for example, of a number of parallelly connected thyristors, such as four such thyristors. As a result, there will be fewer extinction thyristors with respect to main thyristors.

The blocking chokes shown in the circuits of FIGURES 1, 2 and 3 connected between each two phases, will be made sufficiently large so that the extinction current pulse which flows via the anti-parallel diode will not increase excessively above the value of the phase current.

It will thus be seen that, in accordance with the present invention, each of the extinction capacitators is controlled by a bridge circuit comprising four extinction thyristors connected in capacitor/bridge circuit, such that the two charging directions of the capacitators are each utilized for one extinction operation. In this way, the frequency with which the capacitators change their charge is reduced to one half, as a result of which the losses are substantially reduced, that is to say, the highest frequency or pulse repetition frequency of the inverter can be substantially increased. Of the four extinction thyristors in each bridge circuit, two of the thyristors will work together, each set of two thyristors alternating with the other set of two thyristors, so that exceedingly high power ratings and exceedingly high frequencies can be attained without it being necessary to connect a number of extinction thyristors in parallel with each other. It will thus be appreciated that the change-over choke, heretofore inherent in the prior art circuits, will be eliminated. Furthermore, the inverter according to the present invention also avoids the losses which occur at the change of charge of the capacitors due to the damping of the resonant circuit. Furthermore, the main thyristors will not be subjected to the additional load represented by the change of charge current of the extinction capacitors.

It will also be appreciated that if an inverter is pulse-operated in conjunction with a polyphase motor, for example, a squirrel cage rotor motor whose current is regulated, high pulse frequencies will be obtained if the motor is designed to have small leakage reactance, so that with the inverter circuit designed in accordance with the prior art, that is to say, with a change-over circuit, relatively large chokes had to be connected ahead of the motor, this being necessary so long as the operating frequency was low, whereas these chokes had to be short-circuited at higher operating frequencies in order to avoid voltage drops. By using an inverter according to the present invention, however, this choke connected to the motor can be eliminated, or at least a substantially smaller choke can be used.

While the main thyristors should, in order to keep the capacitors within reasonable limits, by thyristors having as short a recovery time as possible, it is not essential that the extinction thyristors have extremely short recovery times, instead, the extinction thyristors can be thyristors have a recovery time which is twice as long or longer than the recovery time of the main thyristors, as a result of which the thyristors can be designed for higher voltages and currents.

The present invention can be used in circuits other than the three phase bridge circuits shown in the drawings, particularly in the case of higher pulse circuits if it is essential that the harmonics in the load current be attenuated.

Furthermore, in the case of current regulation, the inverter according to the present invention may also be so controlled as to produce substantially sinusoidal currents. That is to say, the inverter can be controlled in such a manner that the phase current instead of having a square wave shape, has an approximately sinusoidal wave form as dictated by the nominal value generator, so that the fifth and seventh harmonics of the current will be eliminated, or at least sharply attenuated.

In order to limit the change-over frequency of the extinction capacitors, a small choke can be connected directly in series with the individual extinction capacitors.

In order to free the thyristors from switching-in losses in the case of frequent switching operations, switching-in chokes, as, for example, those having ferrite cores, can be used in conjunction with suitable resistor and capacitor circuits connected to the circuit.

It will be understood that the above description of the present invention is susceptible to various modifications, changes and adaptations, and the same are intended to be comprehended within the meaning and range of equivalents of the appended claims.

What is claimed is:

1. In a self-commutating inverter having a plurality of phases connected across a D.C. power source, each one of said plurality of phases comprising at least two power controlling elements, the combination which comprises:

(a) at least two extinguishing capacitors;
(b) at least two commutating bridge circuits, each composed of four extinguishing thyristors, each one of said capacitors being connected across the diagonal of a respective one of said commutating bridge circuits; and
(c) means for periodically switching said commutating bridge circuits with said extinguishing capacitors to a different one of said plurality of phases for turning off said power controlling elements under push-pull operation of said capacitors.

2. A self-commutating inverter, the combination which comprises:

(a) means connected across a D.C. power source forming an A.C. circuit having at least one phase, said phase comprising two main thyristors and two reactive current diodes connected in bridge circuit;
(b) two capacitor bridge circuits associated with each phase of said A.C. circuit, each capacitor bridge circuit comprising four thyristors connected to form the four arms of said bridge circuit and a capacitor connected across the diagonal of said bridge circuit, said bridge circuits being connected for push-pull operation of said capacitors; and
(c) means for connecting each of said two capacitor bridge circuits across each of said two main thyristors.

3. The combination defined in claim 2 wherein there are a plurality of phases and wherein said connecting means include controllable elements for switching the capacitor bridge circuits to the thyristors of the respective phases.

4. The combination defined in claim 2 wherein said means connect the two capacitor bridge circuits directly across the respective main thyristors.

5. A self-commutating inverter, the combination which comprises:

(a) means connected across a D.C. power supply forming an A.C. circuit having at least one phase, said phase comprising two power controlling elements and two reactive current diodes connected in bridge circuit;
(b) said power controlling elements being constituted by two respective capacitor bridge circuits, each bridge circuit comprising four thyristors connected to form the four arms of said bridge circuit and a capacitor connected across the diagonal of said capacitor bridge, said bridge circuits being connected for push-pull operation of said capacitors.

References Cited

UNITED STATES PATENTS

| | | | |
|---|---|---|---|
| 3,219,905 | 11/1965 | Davis et al. | 321—8 |
| 3,229,179 | 1/1966 | Hetzel. | |
| 3,262,036 | 7/1966 | Clarke et al. | |
| 3,273,046 | 9/1966 | Bedford | 321—45 |

LEE T. HIX, *Primary Examiner.*

W. M. SHOOP, JR., *Assistant Examiner.*